United States Patent [19]

Ducrocq et al.

[11] 3,964,088
[45] June 15, 1976

[54] MULTI-UNIT EQUIPMENT MAINTENANCE SYSTEM

[75] Inventors: Claude Ducrocq, Le Pecq; Robert Hacques, Plaisir; Maurice Hubert, Versailles; Robert Touze, Noisy-le-Roi, all of France

[73] Assignee: Compagnie Internationale pour l'Informatique, Louveciennes, France

[22] Filed: Dec. 16, 1974

[21] Appl. No.: 533,458

[30] Foreign Application Priority Data
Dec. 27, 1973 France .............................. 73.46458

[52] U.S. Cl. ............................................ 340/172.5
[51] Int. Cl.² ......................................... G06F 11/00
[58] Field of Search ................................. 340/172.5

[56] References Cited
UNITED STATES PATENTS

| | | | |
|---|---|---|---|
| 3,603,936 | 9/1971 | Attwood et al. | 340/172.5 |
| 3,623,011 | 4/1971 | Baynard, Jr. et al. | 340/172.5 |
| 3,806,887 | 4/1974 | Schulte et al. | 340/172.5 |

*Primary Examiner*—Gareth D. Shaw
*Assistant Examiner*—C. T. Bartz
*Attorney, Agent, or Firm*—Kemon, Palmer & Estabrook

[57] ABSTRACT

An equipment for execution of maintenance operations in a multi-unit processing system one of which is a central unit comprises, in each unit, shift registers each made of a hardware series connection of multi-bit and single-bit register members which are parts of the unit and which, for part of them, copy the conditions of parts of the unit, and a local automaton for actuation and control of said shift registers, and a common maintenance station having command and data exchange facilities with the said local automatons. Each local automaton includes means responsive to local and remote commands for controlling read-out and write-in operations of said shift registers, interrupts of the operation of the unit and test and diagnosis routine executions by the said unit from the data in the said shift registers.

10 Claims, 4 Drawing Figures

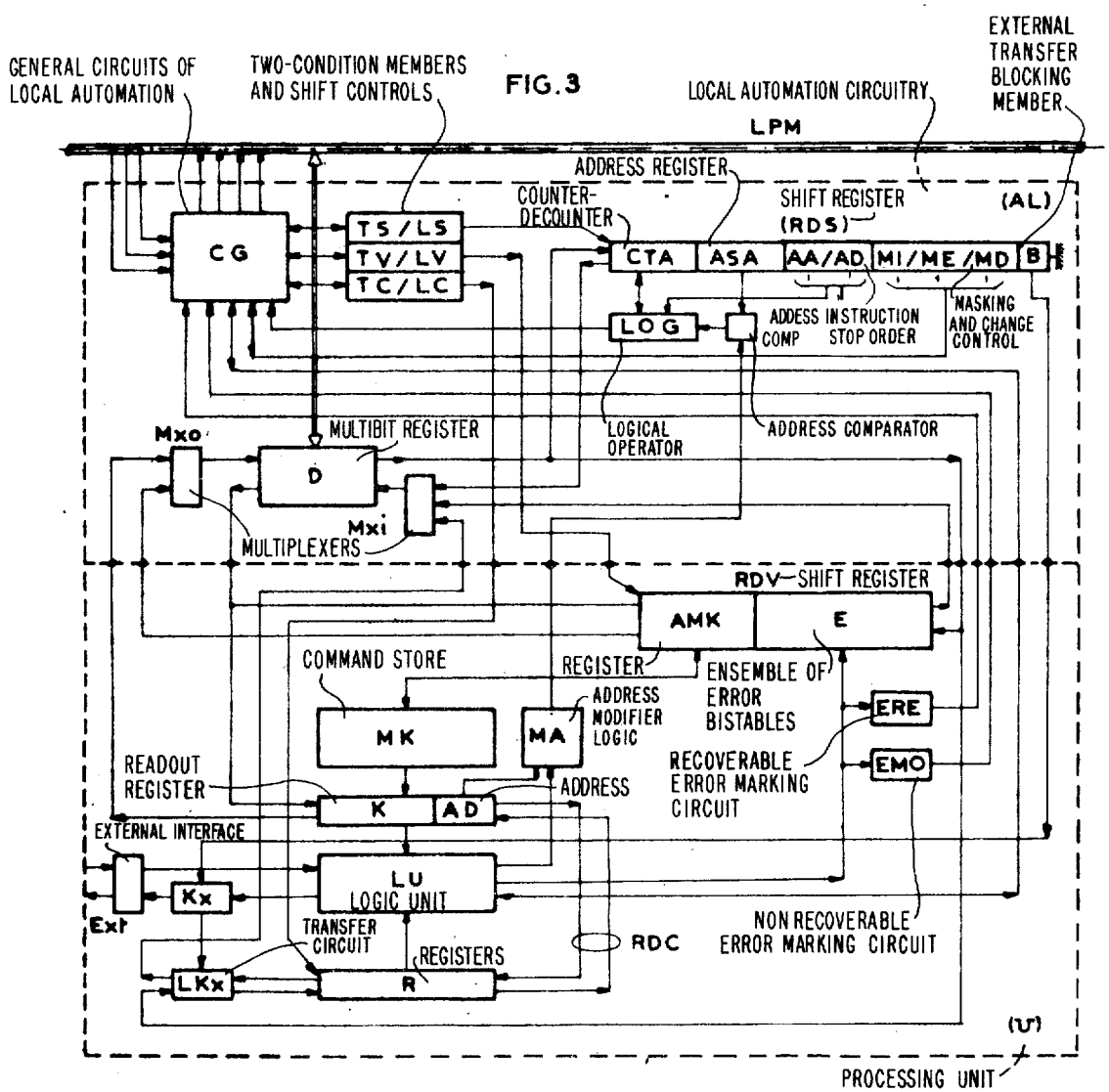
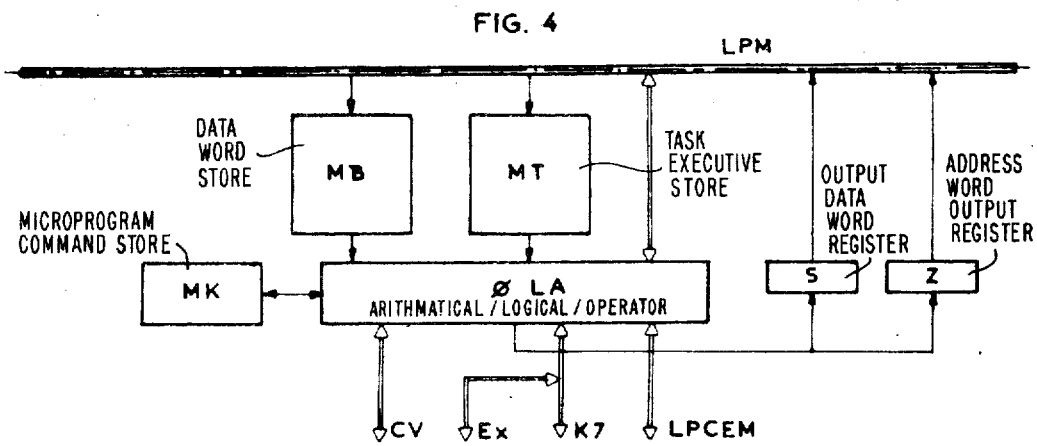

MULTI-UNIT EQUIPMENT MAINTENANCE SYSTEM

BRIEF SUMMARY OF THE INVENTION

The present invention concerns improvements in or relating to equipment for the maintenance operations in information processing systems comprising diversified processing units, at least one of which is a central processor unit.

It has already been proposed, as for instance in U.S. Pat. No. 3,623,011, entitled "Time shared Access to Computer Registers" filed June 25, 1969 and assigned to BELL TELEPHONE LABORATORIES INC. and WESTERN ELECTRIC COMPANY, to distribute such a maintenance equipment throughout the units of a system by means of specialized busses independent of the busses enabling the information exchanges between the units and to control said specialized busses from a specialized "maintenance station". Said station may be a small computer operating in two-way exchange relation with the central unit of the system. From said specialized busses are commanded and controlled in each unit organizations enabling the test of the status of existing registers of the unit and enabling, when required, the remotely controlled execution of diagnosis programs by the unit.

It is an object of the invention to provide improved means in such kinds of maintenance equipment such that, on the first part, it may be applicable to units which do not, themselves, include operational shift registers and, on the second part, it may provide execution of tests during the execution of a task by the unit as well as it may provide execution of special tasks such as a diagnosis task after an interrupt of the execution of a normal or routine task by the unit.

According to a feature of the invention, shift registers specially adapted for the maintenance operation purposes are created in each unit from a series hardware connection of multibit and single-bit registers of the unit and which, for part of them, copy the conditions of certain registers of the unit, each one of the multi-bit or single-bit registers in such shift registers or the conditions of which are copied in the said shift registers being normally provided with further functional and "normal" connections in the structure of the said unit. Each unit is provided with local automaton means for actuation and control of the said shift registers, each such local automaton being responsive to local and remote commands for controlling read-out and write-in operations of the said shift registers, interrupts of execution of a task in the unit and controls of execution of substitute test and diagnosis routines by the unit. A common maintenance station communicates with the said local automaton means through their own exchange communication links.

According to a further feature of the invention, such hardwired shift registers comprise, per unit, a first shift register having members which are active in the execution of a task and a second shift register having members containing information on the status of active members of the unit, the local automaton means of the unit comprising means for selective activation of the first and second shift registers.

BRIEF DESCRIPTION OF THE DRAWINGS:

These and further features will be described in full detail with reference to the accompanying drawings, wherein:

FIG. 3 shows a more detailed example of execution of the part of the maintenance equipment in a unit of the system, said unit being of a conventional microprogrammed kind, and, FIG. 4 shows in block form, an embodiment of the common maintenance station of the equipment.

Figure 1:
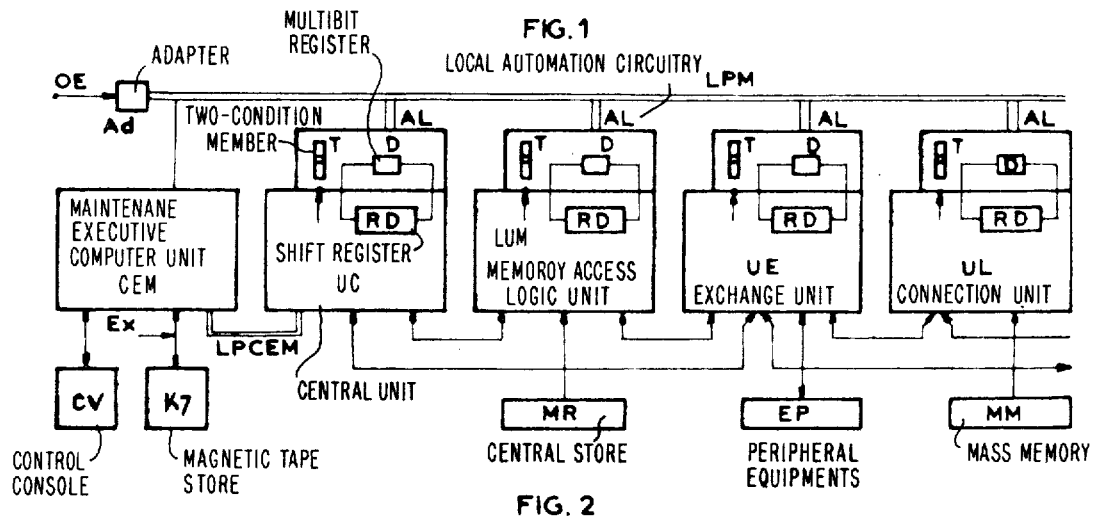
FIG. 1 shows the general organization of a maintenance equipment in an information multi-unit processing system.

DETAILED DESCRIPTION:

The information processing system shown in FIG. 1 comprises a central unit UC having exchange connections to an exchange logic unit LUM for accessing a central store MR and having exchange connections to such units as UE for accessing peripheral equipment EP and to such exchange units as UL for accessing data mass stores MM. The communications from the central unit to each one of the said other units of the system are two-way communications bath for requests and for data exchange.

A maintenance equipment is associated with the information processing system and comprises a maintenance station CEM having a command and data exchange communication link LPCEM to the central processor unit UC. Each unit of the system, except the maintenance station, is provided with a local automaton for execution of maintenance operations such as test, supervision and diagnosis and the like, i.e. any such local automaton is a local operator capable of managing such maintenance actions, in relation to particular means created in the unit for this purpose. Said means consists of one or more shift registers such as RD in FIG. 1, wherein each local automaton AL is merely illustrated by a multi-bit register D and a two-condition, or bistable, member T. The local automatons are connected to an exchange communication link LPM to the CEM unit. As many two-condition members T are provided as are shift registers such as RD in the unit and the multi-bit register D serves as an input-/output member either for all the shift registers or the multi-bit register D is repeated as many times as are shift registers in the unit. In either case, the multi-bit register D closes a loop for the corresponding shift register RD. The multi-bit register D enables data to be read out from or written into the concerned shift register RD. The read-out data may be sent to the maintenance station CEM. The data to be written into the shift registers may be sent from this maintenance station and the maintenance station can send commands to the local automatons through the LPM link. Each two-condition member, when actuated by either a local or a remote command, activates the operation of the corresponding shift register RD.

It may be noted that the maintenance station may be omitted in less elaborate equipment and the Central processor unit UC can be used to perform the functions devoted to the said maintenance station. Such a restricted arrangement is nevertheless not especially desirable since it would impose too heavy a burden on the central processor unit unless the system is of the slow operating type. Further, if the central unit fails, maintenance equipment would then be inoperative. With the provision of a separate maintenance station CEM, this last occurrence cannot exist when, as shown, the processor cell constituting the maintenance station is connected to external sources of information such as K7 and Ex. K7 may for instance be a selfcontained magnetic tape device, Ex may come from another central processor of the system or of a system cooperating with the one shown. If UC fails, CEM may request assistance from such sources. As the maintenance station can fail, too, it has been shown at ad that the link LPM may be connected to an external maintenance control source OE. Such a scheme may for instance be easy to provide when the system comprises two central units such as UC which operate in intercorrelation, as known from so-called twinned processor systems.

The maintenance station may further be connected to an operator's console CV including, for instance, a teletypewriter keyboard for human intervening actions and/or a visualizing device when needed.

One possible organization of the maintenance cell is shown in FIG. 4, which actually summarizes the teachings of the invention disclosed in co-pending application entitled "INFORMATION PROCESSING SYSTEM" filed the same day as the present application for patent and assigned to the same assignee as the present one Ser. No. 533,459. The maintenance station CEM consists of a microprogram operated processor cell comprising a microprogram command store MK, a logical and arithmetical oprator organization $\phi$ LA, which must be understood as including an automatic address progression organization from the extraction (read-out) of microprograms from MK, a data word store MB, a task executive store MT, and the output data word register S and address word register Z of the logical organization operator $\phi$LA. The operator organization $\phi$LA is two-way connected to the link LPM and inputs of MB, MT are connected to said link whereas said link is connected to outputs of the registers S and Z. The operator organization OLA is further shown provided with input/output links to the central unit, LPCEM, the external information sources K7-Ex and the console, CV.

Broadly stated, the operation of the maintenance station CEM is as follows: it may receive requests and data from the local automatons of the units through LPM and send commands to the said local automatons, through LPM, from the output registers S and Z. The maintenance station operates as a multi-microprogrammation unit, having base microprograms in MK and being capable to requesting further microprograms from the central store MC through the central unit UC and from the external information sources. Through LPCEM, it may receive maintenance operation requesting from the central unit.

A maintenance hardwired shift register such as RD is made from series interconnection of functional members of the unit proper, each of which is provided with other and "normal" connections in the unit for satisfying the function of its own. When such a functional member cannot be directly connected in such a hardwired register, said register contains as a substitute thereof an identical member copying, or repeating, at any time, the condition of the unconnectable member. The term "hardwired" is intended to eliminate any and all conditional connection the subject of a switch of connections in the maintenance equipment.

Figure 2:
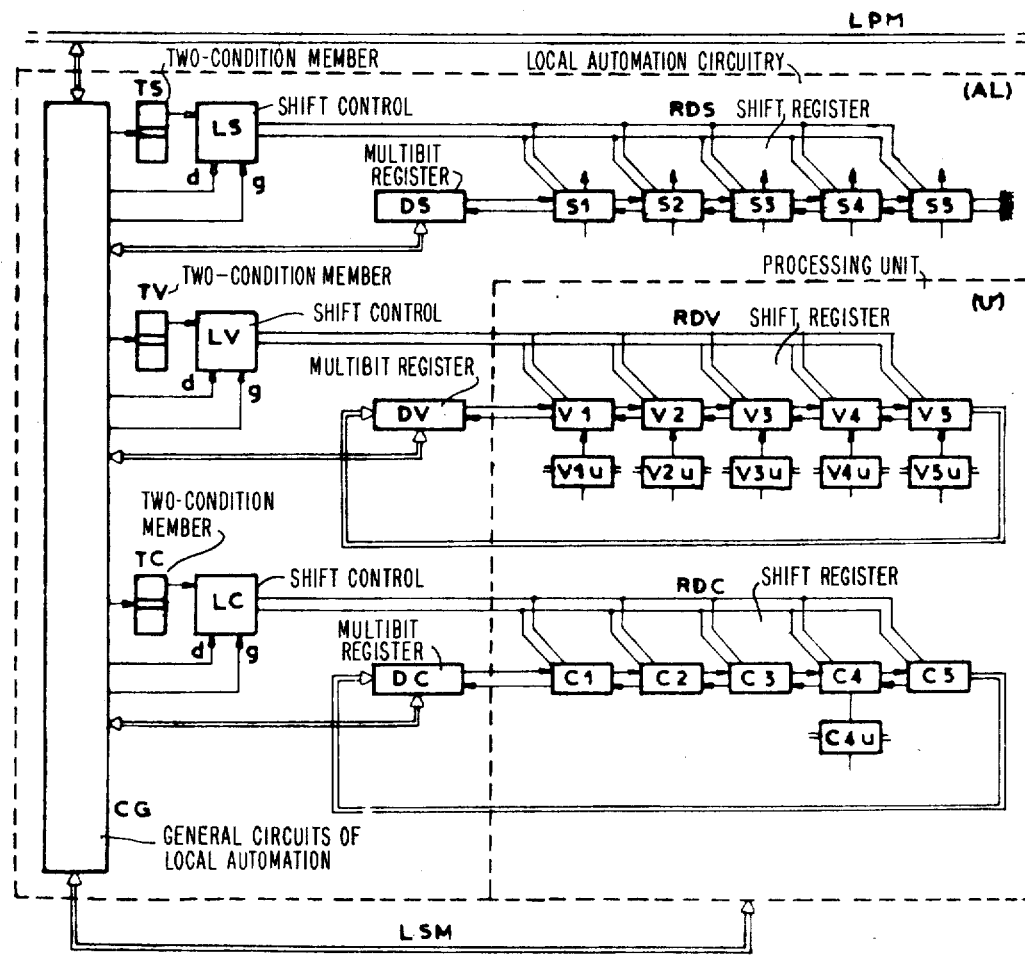
FIG. 2 shows a first example of execution of the part of the maintenance equipment in a unit of the system, said unit being of an unspecified kind.

For a better and clearer understanding of the nature of the maintenance hardwired shift registers which are, according to the invention, included in the maintenance equipment, reference is first made to FIG. 2 which shows an illustrative arrangement of such registers and their command circuitry in a unit of any unidentified kind, and to FIG. 3 which shows an embodiment of the invention in a unit of the microprogram operated processing unit. In said figures, two shift registers are shown of distinct characterization according to a further feature of the invention. The first, RDC is made of the series interconnection of members, C1 to C5 in FIG. 2, which are assumed to be functionally active members of the unit, whereas a second one, RDV is made of the series interconnection of members V1 to V5 which are assumed to be functionally passive members of the unit, so that said second shift registers can be used during the time the unit executes a task whereas the first one can only be used after an interrupt of a task by the unit. From a purely illustrative point of view, the member C4 of the RDC register is shown as repeating the actual condition of an actual member C4U of the unit and all the members V1 to V5 are shown as repeaters of actual members V1U to V5U of the unit. It must be understood, however, that the fewer repeater members are used the better, especially for functionally active members in such units. Duplication of functionally passive members such as error bistable signalling members is of lesser importance as, most often, it will lead to duplication of single-bit registers, which does not materially increase the cost of the equipment.

The shift register RDC is activable from a command LC when the condition of the two-condition member TC, which preferably is a bistable circuit, is controlled for unblocking the activation of the shift control circuit LC. The direction of the shift controlled from LC is determined by the conditions of its inputs $d$ and $g$ which, obviously, must always be in opposed logical levels.

The shift register RDV is similarly controlled from the shift control circuit LV, on actuation of the two-condition member TV, the direction of the shift being determined by the conditions of the logical opposite levels at $d$ and $g$. Reading out and writing in of the informations from and to said registers are provided from multi-bit registers DC and DV which are serially connectable to the shift registers so as to close them in an overall loop. When destructive read-out is required, gates (not shown), inserted between the multibit-register D and the shift register RD, are themselves blocked. The data and commands for controlling the shift registers pass through and are casually memorized within the general circuits of the local automaton which are merely shown as a block CG. Said circuits CG may input and output information from and to the two exchange links LPM, as previously defined, and LSM which is an internal link to the circuitry of the unit (U). Actually, the circuits CG include decoder circuits of command codes from LPM, buffer data circuits from LPM and responsive circuits to failure detector and request signals from LSM. The decoder circuits have outputs for the activation of the shift registers and for the routing to LPM or from LMP of data and they have further outputs to task executive terminal inputs of the unit. Such connections will more clearly appear from the description of FIG. 3.

The local automaton AL may itself include an additional shift register RDS of the same kind as the registers RDC and RDV except that, as shown in FIG. 3, it may not be imperatively a twodirection shift register. Further, of course, the members S1 to S5 are not functional parts of an organization other than the local automaton. The provision of RDS is casual so that, actually, it will not be made in most cases.

The unit (U) of FIG. 3 is a multi-microprogrammed machine of which the main components are shown in their usual relationship. It comprises a microprogram store MK, usually of the read-only kind wherein word selection is under the control of addresses generated by an automatic progression address modifier circuit MA. Each read-out word is transferred to a read-out register K-AD, the part AD of which contains an address code which is used in MA together with data from the logic unit LU of the machine for generation of the address of the next word of the microprogram to be read from the store MK. The content of the part K of the read-out register is applied to the logic unit LU for analysis and execution of the microinstruction it contains. LU is in two-way connection relationship with a set of registers which are commonly shown at R for the sake of simplicity. It must be understood too that set of registers R is shown for the sake of clarity outside the logic unit whereas normally it is included in the unit. The registers of the set R are loaded and unloaded with data in the processing of the instruction words in the logic unit. External information is received by LU through an interface circuit Ext, through which the logic unit sends data to external equipment through a transfer circuit Kx. Within the logic unit LU, a number of error detecting circuits are usually present the results of which are memorized on error indicating bistable members. The logic unit may further include status registers indicative at any time of the status of the machine during execution of a task. Conventionally the outputs of the error detector bistable members are grouped on inputs of two error circuits:- the circuit ERE, the output of which, when activated, indicates the presence of a recoverable error, and the circuit EMO, the output of which, when activated, indicates the presence or occurrence of a lethal error, i.e. an unrecoverable error.

In the local automaton (AL), a single multi-bit register D is included the inputs of which are provided with multiplexing circuits Mxo and Mxi. The register D may receive data from, or issue data to, the exchange data link LPM. The RDC shift register of the maintenance equipment is made by serially connecting in hardware connection mode the register K, the set of registers R and a circuit LKx repeating the condition of the transfer circuit Kx. The RDV register is made of the hardwired series connection of bistable members copying the conditions of the error bistable members in the logic unit LU, and which are shown grouped at E, plus a multi-bit register AMK which repeats at any time the address code outputtig from MA. Both registers are looped on the register D through the multiplexer circuits Mxo and Mxi. It must be emphasized that the members in the shift register RDC and, when needed RDV (for instance AMK) each comprise inputs and outputs of a functional character in the circuitry of the unit, distinct from the inputs and outputs enabling the series connection thereof in such shift registers. Such a condition of series inputs/outputs and of parallel inputs/outputs for the same member exists now for any component parts or grouped component parts of the present technology in the art. Consequently, the said hardwired shift registers do not necessitate any switching of connections from their functional to their maintenance operation and vice-versa.

The shift register RDC is associated in the local automaton is associated with a two-condition bistable circuit TC controlling a command circuit LC for controlling the shifts of information throughout said shift register. As explained with respect to FIG. 2, said shift can be controlled in the one or the other direction. The shift register RDV is similarly associated with two-condition bistable circuit TV controlling a command circuit LV for similarly controlling shifts in the register RDV.

As apparent, the shift register RDC cannot be used when the unit (U) is executing a normal task. On the other hand, the shift register RDV can be manipulated at any time as the members thereof are not active parts of execution of a task by the unit (U).

The output of the recoverable error circuit ERE is connected to an input of the general circuits CG of (A1) which responds to an activation of this input by actuation of TV and signals this actuation through the link LPM to the remote maintenance station. The output of the non-recoverable error circuit EMO is connected to another input of the general circuits CG of (AL) which responds to the activation of said input by actuating both TV and TC and signals this situation through LPM to the said remote station. When the output of EMO turns true, the unit (U) obviously comes to rest. Consequently, it must be understood that the said inputs of CG are wired to actuation inputs of TV and TC and to encoder input circuitry sending codes indicative of the corresponding conditions on the LPM link.

Without unduly coming into program details of supervision, test and diagnosis, the operation of the equipment may be explained as follows:

A first use of the shift register RDV is plain. At any time instant, a decision from the central unit or from the maintenance station may be reached for checking the condition of a unit (U) from a read-out of said shift register. Such a read-out command reaches the local automaton through the link LPM and the circuits CG responds to such a command by actuating the bistable member TV and supplying to LC the information concerning the direction of the shift it will control from this instant of time. The multiplexer MXo and Mxi are simultaneously set for connecting the shift register RDV to the multi-bit register D. Each step of the shift introduces data from RDV into D, and said data is automatically applied to the return path of the link LPM. The read-out is not destructive and, after the number of steps corresponding to the number of data in the register RDV, the operation is automatically stopped and the content of the shift register is identical to the one which has just been read out. The data are interpreted by the maintenance station or the central unit.

When the recoverable error circuit ERE activates its output, the shift register RDV is automatically the subject of a complete read-out and the read-out data are sent from D to the return data path of LPM to the maintenance station.

When the recoverable error circuits ERE and EMO are activated concomitantly, as is the normal case, both registers RDV and RDC will be the subjects of read-out. A priority routine is wired in the CG circuits (for instance TC cannot be actuated unless TV is de-actuated). The data read out from the registers are also sent to the maintenance station from the same path of LPM.

Two cases must be considered when a recoverable error is signalled, further to the actuation of the shift register TV as just above described. In the first case, the unit is provided with error recuperation or recovering self-programmed means. Such means produce an automatic error recovery trial routine to be executed in the unit and this is signalled to the local automaton. When the routine is successful, a signal is sent back to the local automaton which controls a new scan of the contents of the shift register RDV which will display the nature of the error by comparison, at the remote station, of the previous and faulty record in RDV and the corrected new one. When the routine fails, the circuit EMO sends an error signal. In the second case, the unit does not include such an error recovery trial routine. After the read-out of the content of the shift register RDV, the maintenance station may send in a step by step fashion or in a CG buffered fashion such a routine to the local automaton with a command to stop or interrupt the execution of the task in the unit. The microinstructions of this routine may be introduced in the logical unit LU in a step by step fashion or, when MK comprises a read-write portion, it may be temporarily introduced within said store from transferring the microinstruction words of the routine successively in the set of registers R and controlling the introduction of such words into K which then acts as a write-in register for the store. When the routine fails, the logical unit activates the EMO circuit output.

When a non-recoverable error is signalled, the two shift registers are sequentially and successively scanned and the data sent to the maintenance station where it is analysed. When a decision of diagnosis is reached by the station or the central unit, commands and data may be sent through LPM for a step-by-step execution of such a diagnosis routine which program will begin with introduction of fresh data in the RDC shift register as a substitute for the former ones. In this operation, the read-out is destructive, for instance by blocking Mxi. Thereafter orders of execution of a diagnosis routine are sent to the unit through the same process as herein above explained for the error trial routine, except that, each execution of a microinstruction interrupts the execution of the task and a non-destructive readout of the contents of EDC is ensured prior to the execution of the next microinstruction of the routine. It may be said that a diagnosis routine is made according to a combinative logic mode which is known as being of advantageous per se.

When a decision is reached at the maintenance station or in the central unit to interrupt execution of a task in the unit (U), a signal is sent through LPM for simulating an error, thereafter fresh words may be introduced in the shift register RDC to re-initialize the unit and the logic LU is then unblocked. An equipment according to the invention consequently enables a remote control of the tasks in the units.

When required, and for further maintenance purposes, the shift register RDV may be arranged to contain at least one error simulating bistable which may be forced to error, so that special tests may be ordered at any time of the execution of a task in the machine or even when the machine is at rest, such an additional member having its output connected to the circuit ERE or EMO, as needed.

It must be noted that the read-out or write in of the register D, is controlled in series numeration so that the number of wires in the LPM link is suitably low. If the exchanges were made in parallel numeration, the number of wires would obviously be prohibitive.

The maintenance equipment may, though not imperatively and not in each local automaton, be further provided with a third shift register RDS. FIG. 3 shows an example of such a third register, associated with the control circuits TS/LS and said third register, when provided, is connectable across the same multi-bit register D as the two other ones. The provision of this third register has for its purpose to enable the maintenance station CEM to send a complete set of controlling data in a single exchange when the data are loaded in the register, for a local use without intervention of the station. In the example of FIG. 3, such a third register is mainly intended to be used for local control of peripheral equipment controller units, for instance electro-mechanical actuated peripherals, such as magnetic tape readers and the like.

In FIG. 3, the shift register RDS is shown as comprising a counter-decounter CTA, an address register ASA, a bistable member AA controlling a stop on an address, a bistable member AC controlling a stop on an instruction, a non-recoverable error masking circuit MI and a recoverable error masking circuit MD, a routine change control circuit MD and a bistable member B which, when actuated to its "1" condition blocks the external output transfer circuit Kx of the unit. The outputs of the error and routine change control circuits are connected to inputs of CG on members thereof which "cut" or blocks the connections from EME, EMO and the routine change control connection (DER) in said circuits CG, so that, during execution by the unit of a task controlled from RDS no occurring errors can interfere with said task execution. Such a task is controlled from RDS and consists of a repetitive or recurring routine of instructions: any address of the store MK generated in MA is applied to a comparator COMP the other input of which is in ASA; the output of COMP is applied to a logical operator circuit LOG which operates under the data from AA and AC for decrementing by one unit the content of CTA at each activation of the output of the comparator COMP. At each step of operation of the logical operator LOG, an information signal is sent to the command register which, in CG, controls a repetition of the routine by the unit (U) through (DER), as it has been herein above explained for the execution of test and recoverable error controlling operations, except that, in this case, it is from CTA and, more generally RDS, that such routine execution is controlled and no longer directly from the remote maintenance station. When CTA returns to zero, TS comes to work and either an instruction register in CG or a command from the remote station CEM controls the shift of the register RDS so that said register is cleared. As said clearance operation cancels the above mentioned application of masks, any error which may have occurred during imposed execution of the routine will become apparent at the EME and EMO outputs. The condition will now start from the above defined conditions for a recoverable or a non-recoverable error, as the case may be. If no error occurred, the normal operation of the unit is resumed.

What is claimed is:

1. In an information handling system comprising a plurality of diversified processing units interconnected by normal data paths, one of said units being a maintenance and diagnostic signal source and data processing station which is connected by a special data exchange communication link to the other processing units, each processing unit other than said station having internal means responsive to error and failure detections, the combination in each of the processing units interconnected by said special link and station of;

shift registers, each one connectable to said link and each comprising a hard wired series connection of multi and single bit members at least some of which are functional in the unit and others which copy the conditions of functional members of the unit, and automaton circuit means responsive to command signals from the said station and from said error and failure detection means for controlling the actuation of said shift registers for write-in and read-out operations thereof.

2. The combination as defined by claim 1 wherein each processing unit includes first and second shift registers, said first shift register being comprised of members at least some of which are active in the processing of information in said unit and others which copy the conditions of such active members and said second shift register being comprised of members which are passive in the said processing though significant in the status of execution of said processing and others which copy the conditions of such passive members, and wherein said automaton circuit means includes first and second twocondition members responsive to said command signals for the respective actuation of said first and second shift registers.

3. Equipment according to claim 2, wherein said first and second hardwired shift registers are of the twodirection shiftable kind and each of the destructive or non-destructive readout kind according to the conditions of output gates thereof controlled from a command output from the said automaton circuit means.

4. Equipment according to claim 2 wherein said automaton circuit means comprises first and second multi-bit registers which are respectively serially hardwired, connected to the first and second hardwired shift registers in the unit so as to constitute the first and second looped hardwired shift registers and said first and second multi-bit registers have a decimal command and data inputting and outputting connections to said link.

5. The combination as defined by claim 2 wherein said automaton circuit means further includes a third hardwired shift register and a third two-condition member responsive to command signals from said station for the actuation of said third shift register, outputs of members in said third shift register being connected to control and monitor inputs of said processing unit, and wherein a multi-bit buffer register is connected in said automaton circuit means, between said link to said station and an input of said third shift register.

6. Equipment according to claim 2, wherein the automaton circuit means comprises a multi-bit register selectively connectable as a looping member to either the said first or the said second hardwired shift registers through input and output multiplexer circuits addressable from a command decoder in the said automaton circuit means.

7. The combination as defined by claim 6 wherein said automaton circuit means further includes a third hardwired shift register having outputs to control and monitor inputs of said processing unit and a third two-condition member responsive to command signals from said station for the actuation of said third shift register, and wherein said multi-bit register is selectively connectable to said third hardwired shift register as a looping member thereof.

8. The combination as defined by claim 2 wherein said error and failure detection means comprises first and second output circuits, respectively activated on the occurrence in the unit of first and second types of errors and failures, and wherein said automaton circuit means are responsive to the activation of the said first output circuit for controlling the actuation of said first two-condition member and are responsive to the activation of said second output circuit for controlling the actuation of both said two-condition members.

9. Equipment according to claim 8, wherein the automaton circuit means comprises means responsive to the simultaneous actuation of the said two-condition members for ensuring an interrupt of the operation of the unit and calling from the maintenance station data and instructions useful for execution of a diagnosis program.

10. Equipment according to claim 9, wherein the said maintenance station consists of a microprogram controlled processor having command and data exchange facilities with either the central unit of the processing system or an external microprogram source.

* * * * *